July 21, 1964     W. L. McGRATH     3,141,996
THERMAL PROTECTOR
Filed Jan. 2, 1959
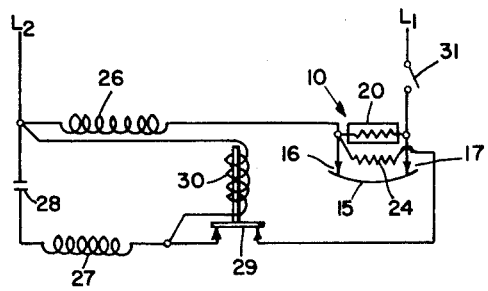
FIG. 2
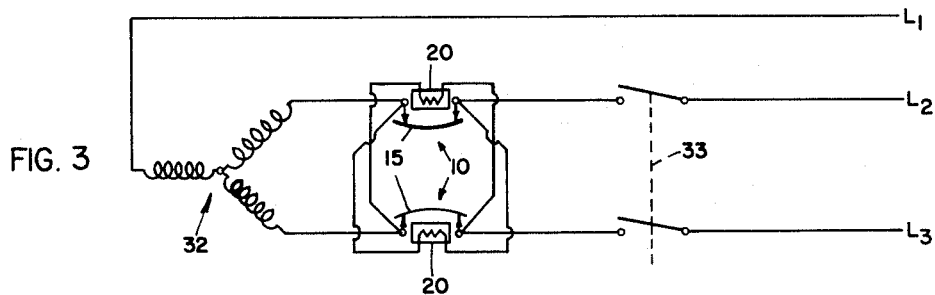
FIG. 3
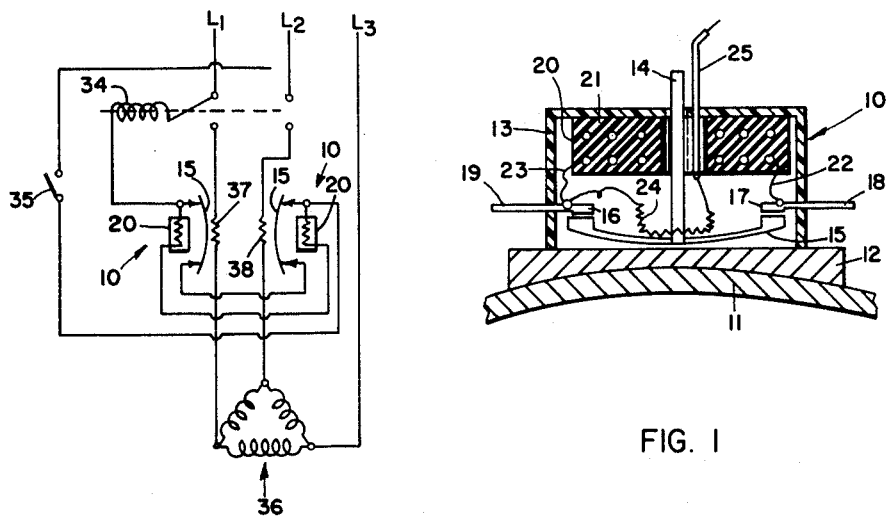
FIG. 4
FIG. 1
*INVENTOR.*
WILLIAM L. McGRATH.
BY
*ATTORNEY.*

3,141,996
THERMAL PROTECTOR
William L. McGrath, Syracuse, N.Y., assignor to Carrier Corporation, Syracuse, N.Y., a corporation of Delaware
Filed Jan. 2, 1959, Ser. No. 784,619
3 Claims. (Cl. 317—13)

This invention relates generally to thermostatic protection circuits and more particularly to thermal protective circuits for the protection of electric motors against overloading and overheating.

In the past in the protection of motors and similar appliances from overloading and overheating, it was customary to utilize integral thermal protectors mounted on the motor barrel which disrupted the flow of current to the motor in the event that overloading or overheating were encountered. These integral protectors were of the type which disrupted the flow of current entirely and had to be manually reset or of the type which automatically reset themselves when the heat which actuated them was removed as the motor cooled because of inactivity. The manual resetting type was inconvenient because the motor on which the protector was mounted was usually in an inaccessible place. The automatic resetting type had one outstanding disadvantage, namely, that it recycled automatically for an indefinite period as the motor heated and cooled and, if not attended, the contacts of the protector froze and caused the motor to burn up. It is with the obviating of the foregoing shortcomings of integral protectors in a practical manner while retaining the desirable features of each type of protector that the present invention is concerned.

It is therefore one object of the present invention to provide a practical and efficient overload protector of the integral type which will positively cut off the flow of current under conditions of overloading or overheating and which will permit current flow to be resumed only when the main control switch is turned off for a short interval of time.

It is another object of this invention to provide a thermal protector which is responsive to both overheating and overloading and which will permit automatic recycling of the circuit for a limited number of times and then lock out completely so as to require manual reset.

A further object of this invention is to provide effective overload and overheat control for both single phase and polyphase motors. Other objects with attendant advantages of the present invention will be readily perceived hereafter.

The present invention relates to a thermal protective device for protection against overloading and overheating. A thermally actuable switch is placed in heat exchange relationship with the device to be protected. Furthermore, the current flowing to the device to be protected is caused to pass through the thermal protector. The thermal protector includes a thermostatic element which is adapted to deflect when it is heated to a predetermined temperature either by a passage of excess current therethrough or by the overheating of the device which it is adapted to protect. When the thermostatic element deflects, a secondary heating element is automatically energized which perpetuates the deflected condition of the thermostat, thus preventing the flowing of additional current to the device to be protected. Under certain circumstances, the protector may be caused to cycle a limited number of times before causing a complete cutout. While the present invention is described in relation to single-phase and polyphase motors, and in various relationships therewith, it will be readily appreciated that it may be used in overload protective circuits for other types of energy translating devices such as generators, transformers, electromagnets, etc. The present invention will be more fully understood when the following portions of the specification are read in conjunction with the accompanying drawings wherein:

FIGURE 1 is a drawing partly in section, of the thermal protector of the present invention;

FIGURE 2 is a schematic representation of the device of FIGURE 1 positioned in a single-phase motor protection circuit;

FIGURE 3 is a schematic representation of the device of FIGURE 1 which is used for protecting a polyphase motor circuit; and FIGURE 4 is a modified form of the device of FIGURE 1 remotely mounted for use with a relay to control a three-phase motor.

The thermal protector 10 of the present invention is shown in FIGURE 1 as being mounted on the shell 11 of an electric motor. The thermal protector consists of a base member 12 and a housing 13. Located centrally within housing 13 is post 14 which carries at one end thereof a snap acting thermostat 15 having contacts at the ends thereof which are adapted to mate with contacts 16 and 17. It is to be noted that thermostat 15 is manufacured in such a manner that it can carry a predetermined amount of current without deflecting. However, if more current should be passed through thermostat 15 than it is designed for, it will heat up and cause itself to deflect so that it will break contact with terminals 16 and 17. This type of thermostat is well known in the art. Instead of this construction a separate resistor which serves as a heater may be placed in series with thermostat 15 to heat the latter when an excessive amount of current flows through the line in which thermostat 15 is located. This structure has not been shown in the drawings for the sake of clarity. Conductors 18 and 19 which terminate at terminals 17 and 16, respectively, are adapted to be placed in series in the line of the device which is to be protected in such a manner that all current flowing through the latter must pass through thermostat 15. A heater 20 comprising a heating wire embedded in a suitable non-conductive base 21 is mechanically attached to the inside of housing 13. Lead wires 22 and 23 place heater 20 in parallel across terminals 16 and 17. It can readily be seen that when the thermal protector 10 is connected in series in a circuit, thermostat 15 thereof, under normal operating conditions, shunts out heater 20.

In the event that thermal protector 10 is to be utilized with a single-phase motor, a supplementary heating resistor 24 is provided for protecting the motor against overload on starting. As can be seen from the drawing, one end of this supplementary resistor is coupled to terminal 16 and the other end is coupled to lead 25 which is adapted to be connected to one side of the starting winding of a single-phase motor, as explained hereafter. The construction of thermal protector 10 will be more fully appreciated when it is seen how it protects a circuit.

In FIGURE 2 the thermal protector 10 is applied to a single-phase motor. A motor having a main winding 26 and a start winding 27 is coupled across leads $L_1$ and $L_2$ in the conventional manner. The motor is of the capacitor-start type utilizing capacitor 28 and a switch 29 for disconnecting the starting winding 27. Switch 29 is shown as being energized by potential relay 30, or it may be actuated by a centrifugal switch or the like, as is well known in the art. As can be seen from FIGURE 2, the thermal protector 10 carries all of the current passing through line $L_1$.

The circuit of FIGURE 2 operates in the following manner: When the motor is not operating, switch 29 is closed. Upon the closing of switch 31 to energize the motor, there will be a flow of current through starting winding 27. Supplementary resistor 24 (FIGURES 1 and 2) is in series with starting winding 27. In the event that the starting current should be in excess of a predetermined safe value, supplementary heater 24 will heat up and cause thermostat 15 to deflect out of contact with its mating terminals 16 and 17. When this occurs, thermostat 15 will no longer shunt heater 20 through which all of the current flowing through line $L_1$ must now pass. The passage of current through heater 20 will tend to heat thermostat 15 so as to perpetuate the open position of the latter. It can readily be seen that the occurrence of an overload during starting will cause thermostat 15 to open causing all of the current for the circuit to pass through heater 20 which, because of its high resistance, will cause a sufficiently high voltage drop to occur so that only a trickle of current will flow through the motor windings and thus prevent operation of the latter.

If there is no overload on starting, relay 30 will open switch 29 after the motor has reached its speed, and thus the flow of current through capacitor 28, start winding 27, relay winding 30, switch 29, and supplementary heater 24 will cease. However, current will continue to flow from $L_1$ through thermostat 15 and winding 26 to $L_2$ to maintain the motor in operation. As noted above, thermostat 15 has a certain amount of resistance inherent therein so that if a predetermined current flow is exceeded, thermostat 15 will heat itself so that it will cause itself to deflect. Therefore, in the event that there is an excess flow of current through thermostat 15, which is in series with running winding 26, or if the motor shell should heat up sufficiently, thermostat 15 will deflect so as to no longer shunt out resistance heater 20. Resistance heater 20 will now be heated up because of the flow of current therethrough and this heat will tend to perpetuate the open condition of thermostat 15. When thermostat 15 is in the open condition, the motor will remain deenergized except for the small leakage current which is utilized to heat heater 20, it being appreciated that the voltage drop across element 20 is sufficiently great to prevent the proper voltage drop across 26 for operation of the motor. If limited recycling is desired, the heater 20 may have a discrete mass which will cause it to heat up relatively slowly so that the thermal protector may recycle four or five times before the temperature of the mass has risen to the point where the thermostat 15 will not snap back to reclose contacts 16 and 17. Once thermostat 15 has opened completely, thermal protector 10 may be reset by opening control switch 31. This allows heater 20 to cool. The thermostat 15 will then snap back to the position where it is in contact with terminals 16 and 17. When switch 31 is closed, the system is restored to normal operation.

In FIGURE 3, the thermal protector switch of FIGURE 1 is shown as it can be applied for protecting a three-phase motor 32 against overload. Thermal protectors 10 are placed in series in lines $L_2$ and $L_3$ and are also mounted on the motor shell (not shown) so that they may be influenced by the temperature of the motor. Heaters 20 are wired in such a way that the heater 20 in one thermal protective member 10 is shunted by the thermostat 15 of the other thermal protective device. Thus, if one of the thermostats trip interrupting the current in that circuit, the heater 20 in the opposite protector will immediately heat up causing the second thermostat to deflect to break the current flow in the other line thus deenergizing all the windings of the motor except for the small leakage current required to heat the heaters 20. In order to reenergize motor 32, switch 33 is opened permitting both heaters 20 to cool to allow thermostats 15 to return to their normal operating position in contact with the terminals which they control; then switch 33 may be closed to place motor 32 back into operation. The heaters 20, as mentioned above, may have a discrete mass so that a limited number of recycles may be allowed before the system locks out completely.

The mode of operation of the circuit of FIGURE 3 is believed to be self-evident from the foregoing description. However it is to be noted that a further advantage of the system on three-phase motors, as set forth in FIGURE 3, is that it eliminates the need for an automatic starter which otherwise is required to provide the overload protection. Thus, thermostats, pressure switches, or other switching devices can be used in direct control of the motor, the requirement being only that they have a two pole construction.

FIGURE 4 illustrates how the thermal protector of FIGURE 1 may be used in conjunction with a relay to control a three-phase motor. A two pole relay 34 is controlled by a suitable switching device 35. Two thermal protective devices 10 are associated with lines $L_1$ and $L_2$ leading to three-phase motor 36. These thermal protective devices are influenced by the temperature of motor 36 and by the current flow in lines $L_1$ and $L_2$ due to the proximity of heaters 37 and 38 to thermal protective devices 10. Heaters 20 are shunted by their respective thermostats 15, as explained above, and the thermostats 15 are in a series circuit with the holding coil relay 34, such that if either thermostat trips due to the heating thereof, the holding coil will be de-energized except for the small amount of current required to heat heaters 20. Thus if either of the thermostats 15 trip because of an overload or overheat condition, the relay 34 will be deenergized thus disconnecting motor 36 from the line. As mentioned above, if a discrete mass is present in the heaters 20, a limited number of automatic recycles can be allowed before the heater heats up sufficiently to prevent discs 15 from reclosing. However, once thermostats 15 are prevented from reclosing by the heat of heaters 20, the holding coil 34 may be disconnected by opening switch 35 until the heaters cool sufficiently so that thermostats 15 again remake the circuit. When this condition is reached, the closing of switch 35 will restore the system to its normal operation.

It is to be further noted that a single thermal protector 10 of the present invention may be used rather than the two shown in FIGURE 4 to effect the same result. When one thermal protector 10 is used, it should be positioned proximate heaters 37 and 38 so that excess current flowing through either of the latter will deenergize the circuit in which holding coil 34 is positioned. It can be readily seen that this arrangement has the advantage of greater simplicity, but that it presents more problems in properly locating the heaters to obtain the desired protection. It is believed that the mode of operation of the device of FIGURE 4 is sufficiently clear so as to render a detailed description thereof at this point unnecessary. Likewise a heater like 37 or 38 can be placed in line $L_3$ to influence a single contact mechanism 10 if this additional protection is desired.

It can thus be seen that I have provided a thermal protective device which is simple in construction and effective in operation and which is capable of wide application for protecting single-phase motors, polyphase motors, and other types of energy translating devices.

While I have described preferred embodiments of my invention, I desire it to be understood that it may be otherwise embodied within the scope of the following claims.

I claim:

1. A thermal protective circuit for a polyphase motor comprising the combination of control means for opening and closing the circuit; a thermal protective device placed in at least each of two conductors of said circuit; each of said devices including a snap-acting thermostat, said thermostat being heated by the passing of an excessive amount of current through the line in which it is located and a heating means in each of said devices positioned proximate each of said thermostats; and circuit means for causing each of said thermostats to shunt the heating means of the other device whereby the passing of excessive current through a line will cause said thermostat to open to in turn cause said heating means shunted thereby to heat and thus open the other of said thermostats.

2. A circuit as set forth in claim 1 wherein said heating means comprises a high resistance imbedded in a discrete mass which heats slowly so that the thermostat may cycle several times before being maintained in current disrupting position.

3. A thermal protective circuit for a polyphase motor comprising the combination of control means for opening and closing the circuit; a thermal protective device placed in at least each of two conductors of said circuit; each of said devices including a snap-acting thermostat, said thermostat being heated on the passing of an excessive amount of current through the line in which it is located and heating means in each of said devices positioned proximate each of said thermostats, said heating means having a discrete mass which causes it to heat slowly so that the thermostat may cycle several times before being maintained in current disrupting position; and means interconnecting the first device in the first conductor of the circuit with the heating element of the second device in the second conductor of the circuit and the second device in the second conductor of the circuit with the heating element of the first device in the first conductor of the circuit so that the passage of an excessive current through the first conductor actuates the thermostat of the first device to open the first conductor thereby actuating the heating means of the second device to heat the thermostat of the second device slowly to open the second conductor.

References Cited in the file of this patent

UNITED STATES PATENTS

| | | |
|---|---|---|
| 1,214,718 | Schweitzer | Feb. 6, 1917 |
| 1,701,757 | Lea | Feb. 12, 1929 |
| 1,798,366 | Burnham | Mar. 31, 1931 |
| 1,830,578 | Vaughan | Nov. 3, 1931 |
| 1,997,673 | Boothby | Apr. 16, 1935 |
| 2,324,161 | Holmes | July 13, 1943 |
| 2,967,977 | McNicol et al. | Jan. 10, 1961 |

FOREIGN PATENTS

| | | |
|---|---|---|
| 542,181 | Great Britain | Dec. 30, 1941 |